United States Patent

Sundstrom et al.

[11] Patent Number: 5,433,299
[45] Date of Patent: Jul. 18, 1995

[54] DISC BRAKE

[75] Inventors: Paul Sundstrom, Calliope; Alan Huth, Gladstone, both of Australia

[73] Assignee: Gladstone Port Authority, Gladstone, Australia

[21] Appl. No.: 199,140

[22] PCT Filed: Aug. 31, 1992

[86] PCT No.: PCT/AU92/00458
§ 371 Date: Feb. 25, 1994
§ 102(e) Date: Feb. 25, 1994

[87] PCT Pub. No.: WO93/05313
PCT Pub. Date: Mar. 18, 1993

[30] Foreign Application Priority Data

Aug. 29, 1991 [AU] Australia .............. PK8070

[51] Int. Cl.⁶ .............................. F16D 65/56
[52] U.S. Cl. ...................... 188/72.7; 188/72.6
[58] Field of Search .......... 188/71.1, 71.2, 72.1, 188/72.7, 72.6, 166, 167, 168, 173, 367, 368, 370, 31, 60, 68, 69

[56] References Cited

U.S. PATENT DOCUMENTS

| | | | |
|---|---|---|---|
| 3,124,219 | 3/1964 | Lee | 188/173 |
| 3,184,003 | 5/1965 | Kershner | 188/72.7 |
| 3,968,864 | 7/1976 | Deichsel et al. | 188/71.9 |
| 4,121,697 | 10/1978 | Kobelt et al. | 188/72.7 |
| 4,154,321 | 5/1979 | Falk | 188/72.7 |
| 4,648,613 | 3/1987 | Hennessy | 188/72.7 |

Primary Examiner—Matthew C. Graham
Attorney, Agent, or Firm—Spensley Horn Jubas & Lubitz

[57] ABSTRACT

A disc brake assembly has a pair of pivoted brake arms carrying brake pads located on respective opposite sides of a disc. The brake arms are biased towards each other by springs to clamp the brake pads against the disc. The disc brake assembly also includes a cam member having two double-sided cams, each of which co-acts with a cam follower mounted on a respective brake arm. The cam member is connected to an actuating cylinder. When the cylinder is energized, the inner cam surfaces drive the cam followers apart to release the brake. When the cylinder is not energized, the outer cam surfaces prevent outward movement of the cam followers thereby positively locking the brake pads against the disc. The disc brake also includes a mechanism for automatically adjusting the position of the brake pads to compensate for wear.

13 Claims, 5 Drawing Sheets

DISC BRAKE

This invention relates to an improved disc brake. More specifically, the invention is directed to improvements in positive locking and self-adjusting disc brake assemblies particularly, but not solely, suitable for use with rotating components of machinery such as conveyor drives, cranes and the like.

BACKGROUND ART

Industrial disc brakes are used to decelerate a drive, such as a conveyor or crane drive, when the motive power is removed, and to hold the drive (and components connected to it) against reverse movement once the drive has stopped.

There are various known disc brake assemblies. An example of a convention disk brake arrangement can be found in U.S. Pat. No. 3,968,864 the disclosure of which is incorporated herein by reference.

However, industrial disc brakes of conventional design have several inherent problems or disadvantages. First, known disc brakes used on industrial machinery do not have a facility enabling the friction pad of the brake to be positively locked onto the disc. Hitherto, disc brakes have relied solely on the pinching action of pre-tensioned disc springs to urge the friction pad into contact with the disc when the disc brake actuator is de-energised.

Secondly, to compensate for wear of the friction pad, some known disc brakes incorporate a complicated wear compensation system designed to hold the friction pad in a constant position relative to the disc face as the friction material of the pad wears away. Such compensation systems typically utilise chains and sprockets and/or several lost motion linkages. In addition to being complex and expensive to construct, the known wear compensation systems require regular maintenance and servicing to maintain them in proper operating condition.

It is an object of the present invention to provide an improved disc brake assembly which overcomes or alleviates at least one of the disadvantages of the prior art.

SUMMARY OF THE INVENTION

In one broad form, the present invention provides a disc brake assembly comprising
 a pair of brake arms, each pivotally mounted at one end and adapted to receive a portion of a brake disc therebetween;
 a respective brake element mounted to each brake arm;
 biasing means for resiliently biasing the brake arms towards each other to urge the brake elements into contact with respective opposite sides of the disc;
 a cam member defining a pair of cam formations;
 a cam follower mounted on each brake arm, each cam follower being operatively associated with a respective one of the cam formations;
 actuating means for moving the cam member;
 characterised in that each cam formation includes first and second cam surfaces, and wherein in use the cam followers are displaced apart by the respective first cam surfaces during motion of the cam member in one direction to thereby release the brake elements from the brake disc, and the brake elements are positively locked into contact with the brake disc by the abutment of the second cam surfaces against the respective cam followers when the cam member is moved in the opposite direction.

Typically, the first cam surfaces are located inwardly of their respective cam followers, i.e. between the cam followers, and the second cam surfaces are located outwardly of their respective cam followers. The first cam surfaces form a wedge-shaped formation on the cam member which drives the cam followers, and hence the brake arms, apart when the cam member moves in one direction. When the cam member moves in the opposite direction, the brake arms come together under the action of the biasing means until the brake elements contact the brake disc. The abutment of the second cam surfaces against their respective cam followers positively locks the brake elements into contact with the disc, and also limits the continued movement of the cam member in the opposite direction. Thus, the extent of the movement of the cam member in the opposite direction is an indication of the amount of wear of the brake elements.

Preferably, the first and second cam surfaces of each cam formation are parallel and opposed.

The term "cam surfaces" refers to the operative portion of the cam and includes a thin or linear cam portion.

Similarly, the term "cam" and "cam follower" as used in this specification are not intended to be restricted to the specific arrangement illustrated in the drawings of the preferred embodiment, but include generally any member defining a surface or path followed by another member.

Advantageously, each brake arm pivots about a pivot axis which is located substantially in the plane of the adjacent face of the brake disc. In this manner, the drag forces induced during braking do not create moment forces on the brake arm.

In the preferred embodiment, each brake element is adjustably mounted to its respective brake arm, and the disc brake assembly includes wear compensation means for automatically adjusting the position of each brake element relative to its respective brake arm to compensate for wear. The wear compensation means is responsive to movement of the cam member beyond a threshold distance in the abovestated opposite direction to cause the brake element to be repositioned incrementally relative to its associated brake arm.

In one embodiment, the wear compensation means comprises a threaded member located on each brake arm. The respective brake element is mounted to one end of the threaded member, and the other end of the threaded member is threaded into a sleeve member journalled in the brake arm. The sleeve member is connected to a ratchet arm having a ratchet head which has a pawl engaging the ratchet teeth. A ratchet arm extends radially from the ratchet head and is connected, via a link arm, to a mounting arm on which the cam member is mounted. The ratchet arm connection to the link arm is preferably adjustable along the length of the ratchet arm.

The mounting arm, in turn, is pivotally connected to the actuating means which is typically a cylinder having an extendable piston. In this manner, the angular movement of the ratchet arm is dependent on the movement of the cam member on its mounting arm. When the cam member moves beyond a threshold distance in the abovestated opposite direction, thereby indicating that a predetermined amount of wear has occurred on the brake element, the angular movement of the ratchet arm is sufficient for the pawl on the ratchet head to engage the next tooth on the ratchet. When the ratchet arm next moves in response to movement of the cam member, the ratchet is rotated to some degree, causing the threaded member, and the brake element mounted thereon, to be moved a certain increment relative to the brake arm in a direction opposite to the brake wear, thereby compensating for the reduction in thickness of the brake element due to brake wear.

The wear compensation mechanism is relatively simple and economic to construct, and requires little maintenance.

The biasing means may suitably comprise one or more springs, each brake element is suitably a friction pad, and each cam follower is suitably a roller or like device.

In order the invention may be more fully understood and put into practice, a preferred embodiment thereof will now be described by way of example only, with reference to the accompanying drawings.

DETAILED DESCRIPTION OF THE PREFERRED EMBODIMENT

Figure 1:
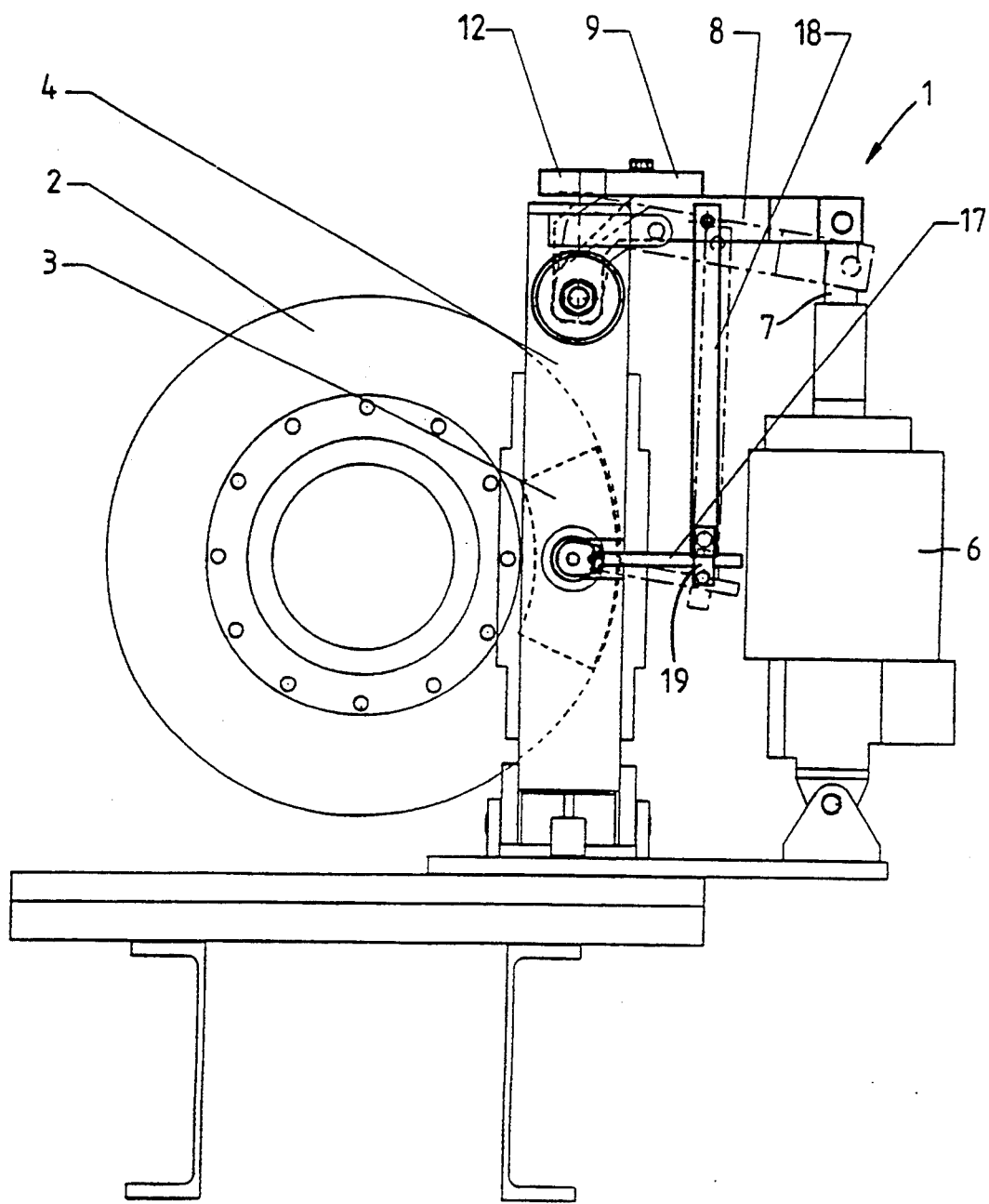
FIG. 1 is an end elevation of a disc brake assembly according to one embodiment of the invention.

As shown in the drawings, the disc brake assembly 1 of the illustrated embodiment is designed to decelerate and hold a disc 2 which typically is mounted to a rotating component of industrial machinery such as a conveyor, crane or the like. However, the disc brake assembly 1 may be used in other applications, railroad rolling stock.

The disc brake assembly 1 comprises a pair of brake friction pads 3 located on either side of the disc 2. Each brake pad 3 is mounted on a respective brake arm 4 (via suitable pad mounting means described in more detail below). One end of each brake arm 4 is pivotally mounted, by a respective pin joint or hinge, to the support or base frame of the disc brake assembly 1. Advantageously, the pivot axis of each brake arm 4 is located in the same plane as the corresponding face of the disc 2, or as close as possible thereto. In this manner, any forces induced by brake drag on the disc 2 do not create any significant moment force on the brake arms 4. Hence the applied braking effort is independent of the direction of the brake disc.

The brake arms 4 are biased towards each other by pre-tensioned disc springs 5 located on a common shaft which extends transversely to the plane of the disc 2 and is supported at its ends by the support frame for the disc brake assembly 1. The springs 5 urge the brake pads together against opposite faces of the disc 2 to decelerate and/or hold the disc stationary when the disc brake is de-energised or deactivated.

Figure 2:
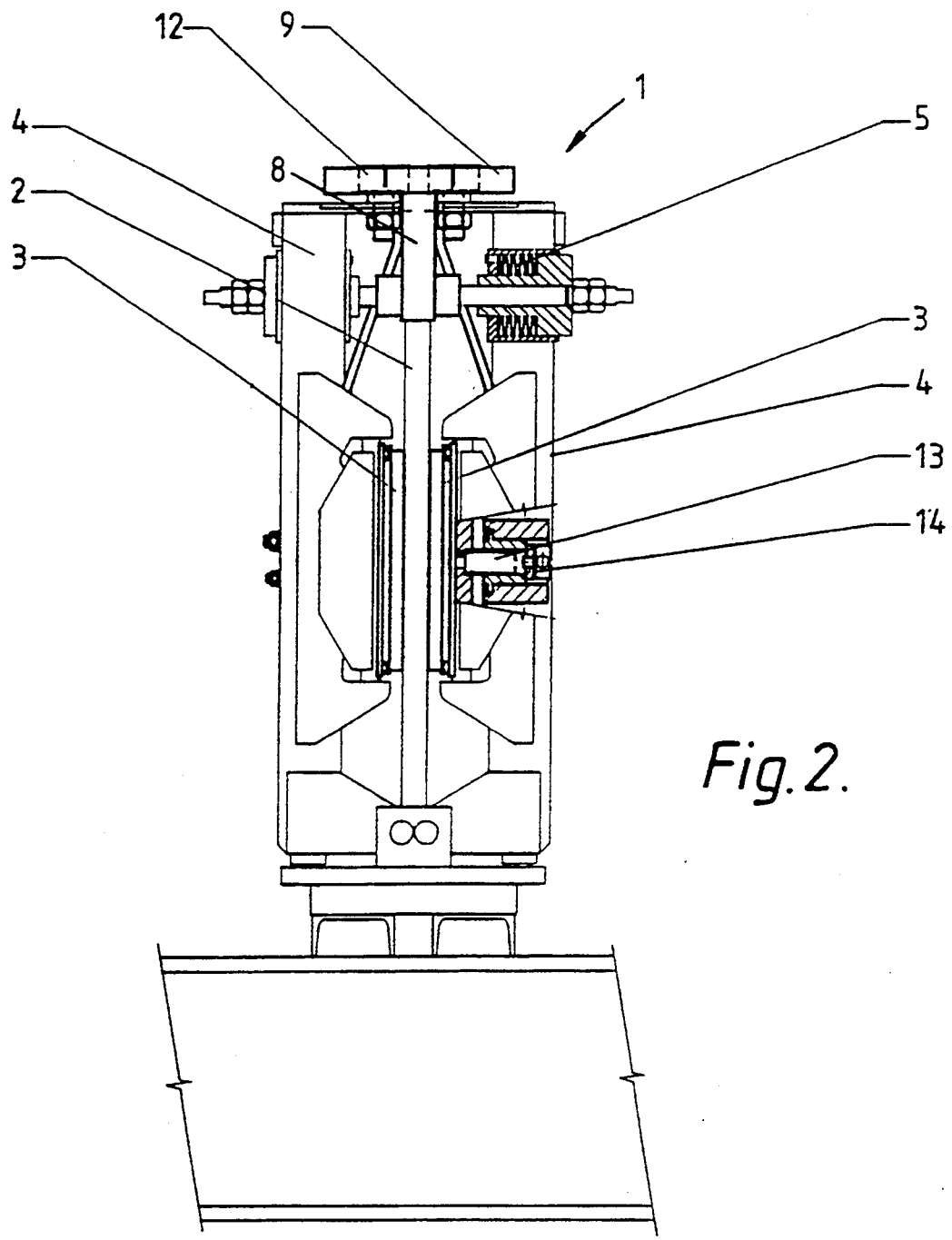
FIG. 2 is a side elevation of the disc brake assembly of FIG. 1.

An activator mechanism is provided to release the brake. The activator mechanism comprises an actuating cylinder 6 having an output shaft 7 connected to one end of a pivoted cam mounting arm 8. The mounting arm 8 has its other end pivotally connected to the common shaft on which the springs 5 are located. Typically, the other end of the mounting arm 8 is provided with a sleeve through which the centre portion of the common shaft is inserted to form a pin joint or hinge, as illustrated in FIGS. 1 and 2.

Figure 3:
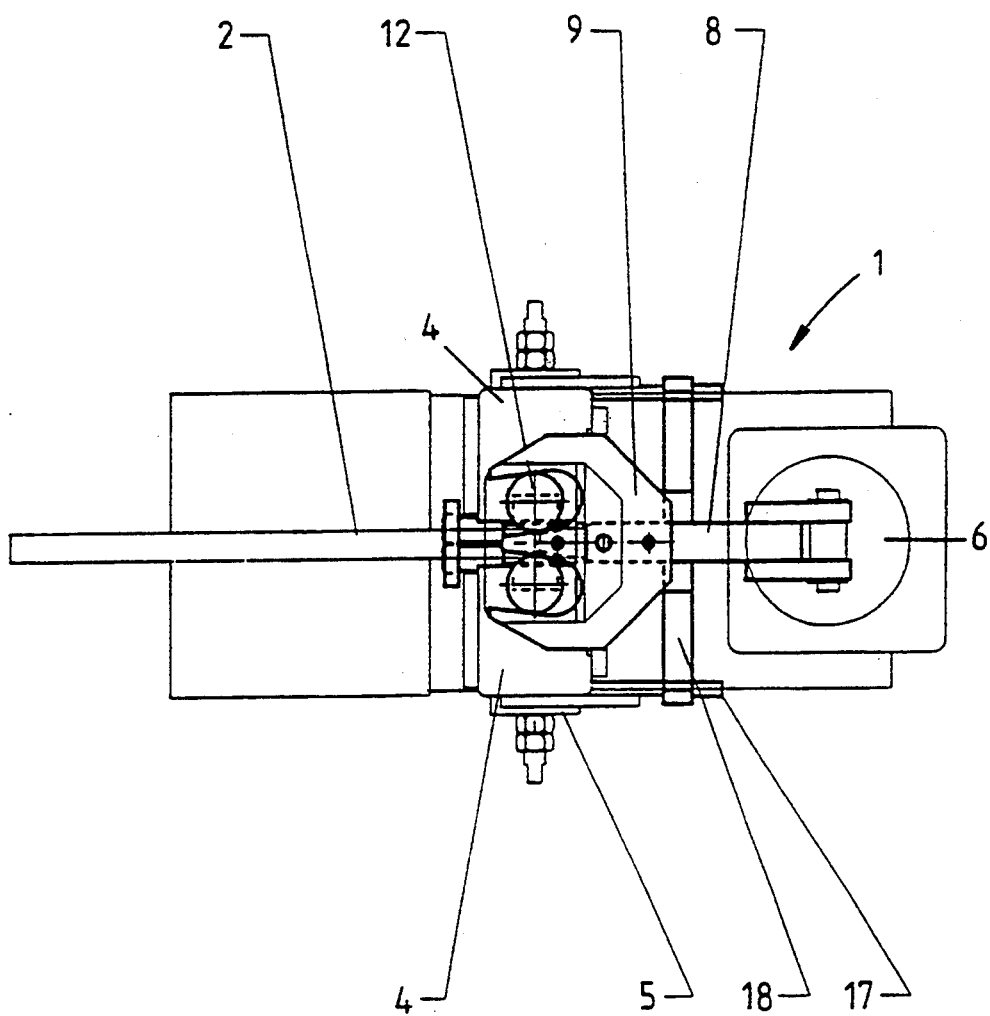
FIG. 3 is a plan view of the disc brake assembly of FIG. 1.
Figure 5:
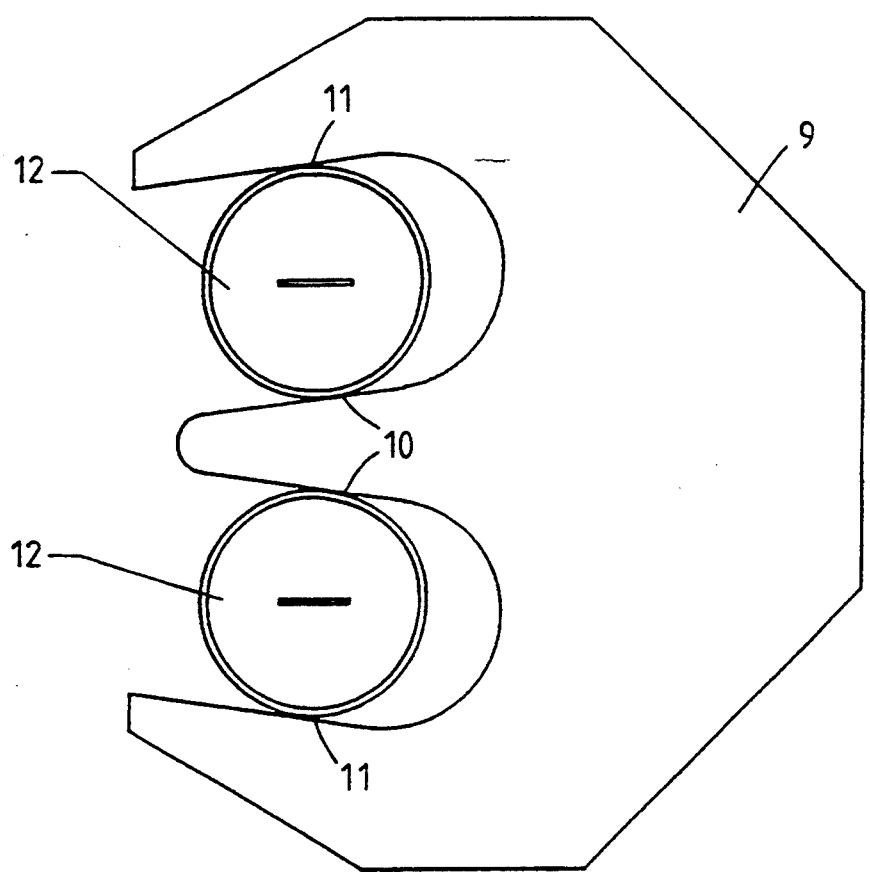
FIG. 5 is a plan view of the cam portion of the disc brake assembly of FIG. 1.

A cam member 9 is mounted on the cam mounting arm 8, as shown more clearly in FIGS. 3 and 5. The cam member 9 is provided with two double-sided cams, one for each brake arm, in mirror image formation about the plane of disc 2. Each cam comprises a first cam surface portion 10, which together form a wedge-shaped portion of the cam member 9, as can be seen more clearly in FIG. 5. Each cam also comprises a second cam surface portion 11. For ease of reference, the first cam surface portions 10 will be referred to as the inner cam surfaces or inner cams while the second cam surface portions 11 will be referred to as the outer cam surfaces or outer cams.

A respective cam follower 12 is located in the space defined between the inner and outer cam surfaces in each cam. Each cam follower 12 is typically a roller or like device, preferably rotatable about an axis normal to the plane of cam member 9, and is mounted to the upper end of a respective brake arm 4.

In use, when actuating cylinder 6 is energised (extended), its output shaft 7 causes mounting arm 8 to pivot about its pivotal connection to the common shaft. This pivoting action causes the wedge portion formed by inner cams 10 of cam member 9 to be driven further between the cam followers 12, forcing them apart against the biasing action of springs 5. In other words, due to the relative movement between cam member 9 and the cam followers 12, the cam followers 12 follow the respective inner cam surfaces 10 and move apart, thereby causing the brake arms 4 on either side of the disc 2 to retract the brake pads 3 from the disc faces and release the disc.

To clamp the disc 2, the actuating cylinder 6 is de-energised (retracted), causing the cam 9 to retract and allowing the brake arms 4 to move towards each other under the biasing action of the springs 5 and thereby decelerate and/or hold the disc 2 stationary by clamping it between brake pads 3.

An advantageous feature of the abovedescribed disc brake assembly 1 is the provision of outer cam surfaces 11. When the actuating cylinder 6 is de-energised and cam member 9 retracts, the cam followers 12 follow the inner cam surfaces 10 until the brake pads 3 abut opposite faces of disc 2. The outer cam surfaces 11 then abut their respective cam followers 12 and prevent the cam followers 12 from moving outwardly, and hence prevent the brake pads 3 from being moved off the disc. Due to a small tolerance (typically 0.1 mm) between the cam followers 12 and their associated cams, the cam member 9 will continue retracting to a small extent after the brake pads 3 contact the disc 2, until the outer cams 11 abut the cam followers 12. However, this additional movement is negligible and the locking of the brake pads 3 onto the disc 2 is virtually instantaneous with their contact with the disc 2.

Unlike known disc brakes (such as that of U.S. Pat. No. 3,968,864) which rely only on spring forces to clamp the brake pads against the disc, the outer cam surfaces 11 of the described disc brake assembly 1 are held against the cam followers 12 by the retracted cylinder 6 and shallow cam angle, thereby providing positive locking of the brake pads against the disc when the actuator is de-energised.

Figure 4:
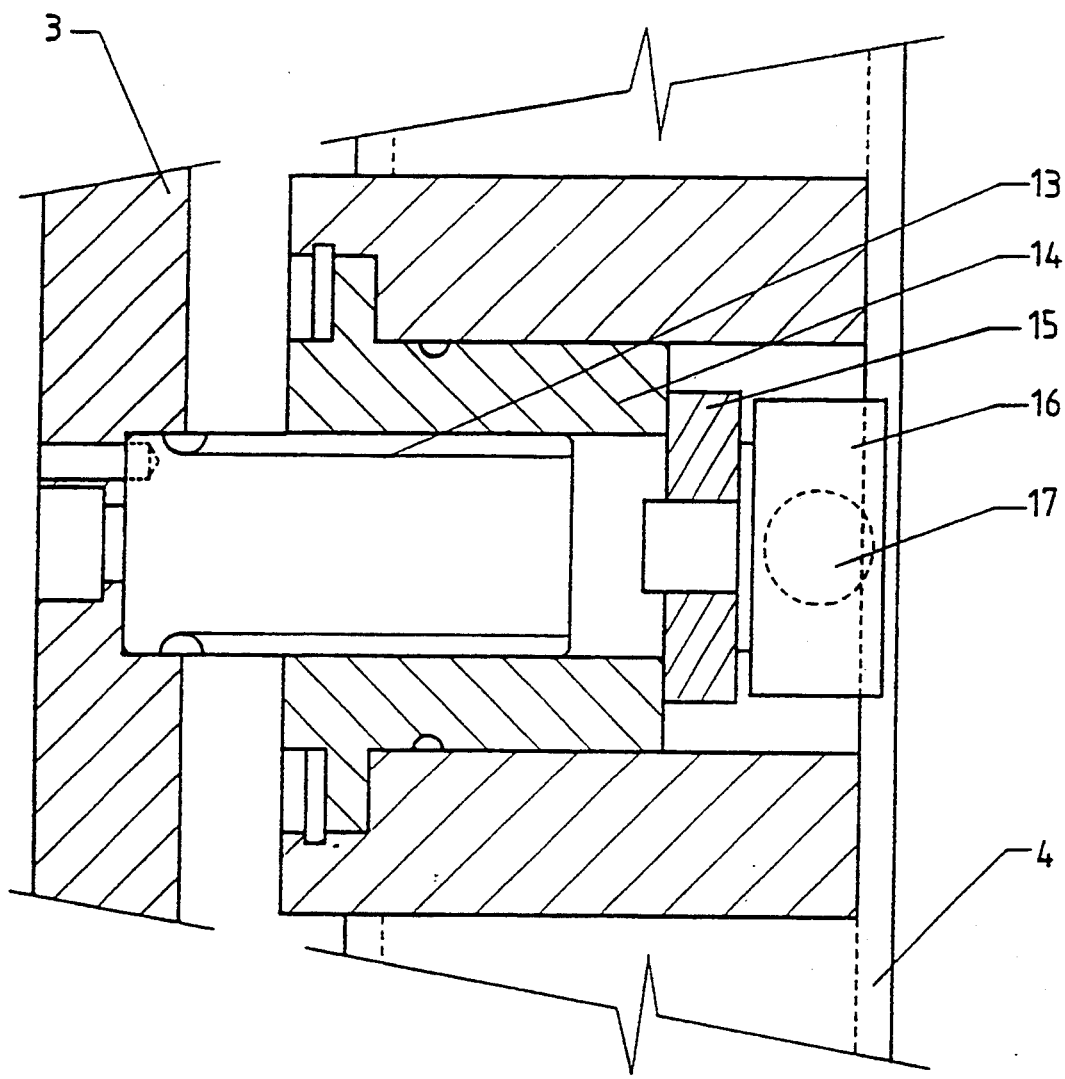
FIG. 4 is a sectional view of the jacking screw assembly of the disc brake assembly of FIG. 1.

The disc brake assembly of the preferred embodiment also includes a simplified system for automatically compensating for wear of the brake pads 3. As depicted in FIG. 4, each brake pad 3 is mounted to the end of a jacking screw 13 which is threadedly mounted in a jacking screw rotating bush 14. The bush 14 is connected to, and rotatable with, a co-axial ratchet 15 which co-acts with a ratchet head 16 having a pawl therein which engages the teeth of ratchet 15. A ratchet arm 17 has one end connected to the ratchet head 16 and extends radially therefrom. The ratchet arm 17 is pivotally connected to one end of a link arm 18, the other end of which is pivotally connected to mounting arm 8, as shown in FIG. 1.

The bottom of link arm 18 is pivotally connected to a block 19 which is slidable along ratchet arm 17, and able to be clamped in position. Thus, the effective length of arm 17 can be varied. This enables the length of the ratchet arm 17 to be "tuned" to each brake unit's actual clearance between the outer cams and their followers, i.e. it takes into account this tolerance (as well as tolerance in follower diameter) and avoids the need for extremely precise machinery of the outer cam 12.

The ratchet arm length is also a function of the number of teeth on the ratchet wheel.

In use, as the wedge formed by the inner cams 10 moves in and out between the cam followers 12 during application and release of the brake, the ratchet handle 17 describes a small arc, as illustrated in FIG. 1. As the brake pads 3 wear, the travel of the cam member 9 increases. That is, the brake arms 4 and cam followers 12 come closer together during braking, and the cam member 9 and its associated mounting arm 8 move backward to an ever increasing degree, causing ratchet arm 17 to describe a greater arc. When a threshold amount of wear has occurred, the arc travelled by ratchet arm 17 will have increased to such an angle that the ratchet head 16 will index to the next tooth on ratchet 15. On next energisation of actuator 6, the ratchet arm 17 will move upwardly, taking with it the newly indexed tooth on ratchet 15 and causing bush 14 to turn through an angle. (This angle is roughly equal to 360° divided by the number of teeth on the ratchet). The relative rotation between jacking screw 13 and bush 14 moves the brake pad 3 slightly away from the brake arm 4, thereby compensating for the wear automatically. When the cam member 9 next retracts, it does so to a lesser extent due to the preceding incremental adjustment. The ratchet arm 17 will therefore not describe a sufficiently large arc to cause ratchet head 16 to index to the next tooth, the pawl in the ratchet head will simply ride over the flank of the tooth. However, with increasing wear, the travel of cam member 9 will again increase gradually until at some stage the travel of ratchet arm 17 is sufficient for ratchet head 16 to engage a new tooth on ratchet 15. The above process repeats itself for every predetermined increment in brake pad wear, over the life of the brake pads.

The abovedescribed wear compensation mechanism is simple and economic to construct, and requires minimal servicing.

Further, the outer cams 11 inherently limit the travel of cam member 9 and ratchet arm 17 on de-energisation of cylinder 6, thereby avoiding the need for lost motion linkages as used in the mechanism of U.S. Pat. No. 3,968,864.

The foregoing describes only one embodiment of the invention, and modifications which are obvious to those skilled in the art may be made thereto without departing from the scope of the invention as defined in the following claims. For example, although the illustrated disc brake assembly is a double brake acting on both sides of the disc, it can be modified for use with a single brake pad coacting with a rotating member. Further, the ratchet assembly 15, 16 may be replaced by any other suitable one-way clutch. The power screw 13/bush 14 arrangement can also be modified, e.g. either the male threaded rod or female nut may be driven by the ratchet.

We claim:

1. A disc brake assembly comprising
a pair of brake arms, each pivotally mounted at one end and adapted to receive a portion of a brake disc therebetween;
a respective brake element mounted to each brake arm;
biasing means for resiliently biasing the brake arms towards each other to urge the brake elements into contact with respective opposite sides of the disc;
a cam member defining a pair of cam formations;
a cam follower mounted on each brake arm, each cam follower being operatively associated with a respective one of the cam formations;
actuating means for moving the cam member;
characterised in that each cam formation includes first and second cam surfaces, and wherein in use the cam followers are displaced apart by the respective first cam surfaces during motion of the cam member in one direction to thereby release the brake elements from the brake disc, and the brake elements are positively locked into contact with the brake disc by the abutment of the second cam surfaces against the respective cam followers when the cam member is moved in the opposite direction.

2. A disc brake assembly as claimed in claim 1, wherein the first cam surfaces are located inwardly of their respective cam followers and form a wedge-shaped formation on the cam member, and the second cam surfaces are located outwardly of their respective cam followers.

3. A disc brake assembly as claimed in claim 1, wherein the first and second cam surfaces of each cam formation are parallel and opposed.

4. A disc brake assembly as claimed in claim 1, wherein the abutment of the second cam surfaces against their respective cam followers limits the movement of the cam member in said opposite direction.

5. A disc brake assembly as claimed in claim 1, wherein each brake element is adjustably mounted to its respective brake arm.

6. A disc brake assembly as claimed in claim 1, wherein each of the brake arms pivots about a pivot axis located substantially in the plane of the adjacent face of the brake disc.

7. A disc brake assembly as claimed in claim 1, further comprising wear compensation means for automatically adjusting the position of each brake element relative to its respective brake arm to compensate for wear, the wear compensation means being responsive to movement of the cam member beyond a threshold distance in said opposite direction to cause the brake element to be repositioned incrementally relative to its associated brake arm.

8. A disc brake assembly as claimed in claim 7, wherein the wear compensation means comprises a threaded member located on each brake arm, each threaded member having the respective brake element mounted to one end thereof, and having its other end threaded into a sleeve member rotatably mounted in the brake arm, the sleeve member being connected to one component of a ratchet and pawl assembly, the wear compensation means further comprising a ratchet arm connected to, and extending radially of, the other component of the ratchet and pawl assembly, the ratchet arm being responsive to movement of the cam member.

9. A disc brake assembly as claimed in claim 8, wherein the cam member is mounted on a mounting arm pivotally connected to the actuating means, further comprising a link arm pivotally connected at its ends to the mounting arm and the ratchet arm, respectively.

10. A disc brake assembly as claimed in claim 9 wherein the connection of the link arm to the ratchet arm is adjustable in position along the ratchet arm.

11. A disc brake assembly as claimed in claim 1, wherein the biasing means comprises one or more springs, each brake element is a friction pad, each cam follower is a roller, and the actuating means comprises a cylinder having an extendible piston.

12. A disc brake assembly comprising
at least one pivotally mounted brake arm having a brake pad mounted thereto;
bias means for resiliently biasing the brake arm to urge the brake pad into contact with a rotatably disc member;
a cam member, and an actuating member for moving the cam member;
a cam follower mounted on the brake arm;
characterised in that the cam member has first and second opposed cam surfaces, whereby the cam follower is displaced by the first cam surface during motion of the cam member in one direction to thereby release the brake pad from the disc member, and the brake pad is positively locked into contact with the disc member by the abutment of the second cam surface against the cam follower when the cam member is moved in the opposite direction.

13. A disc brake assembly as claimed in claim 12, further comprising wear compensation means for automatically adjusting the position of the brake pad relative to the brake arm to compensate for wear of the pad, the wear compensation means being responsive to movement of the cam member beyond a threshold distance in said opposite direction to cause the brake pad to be repositioned incrementally relative to the brake arm.

* * * * *